J. M. & M. M. DUNN.
Ditching-Machines.
No. 146,810.  Patented Jan. 27, 1874.
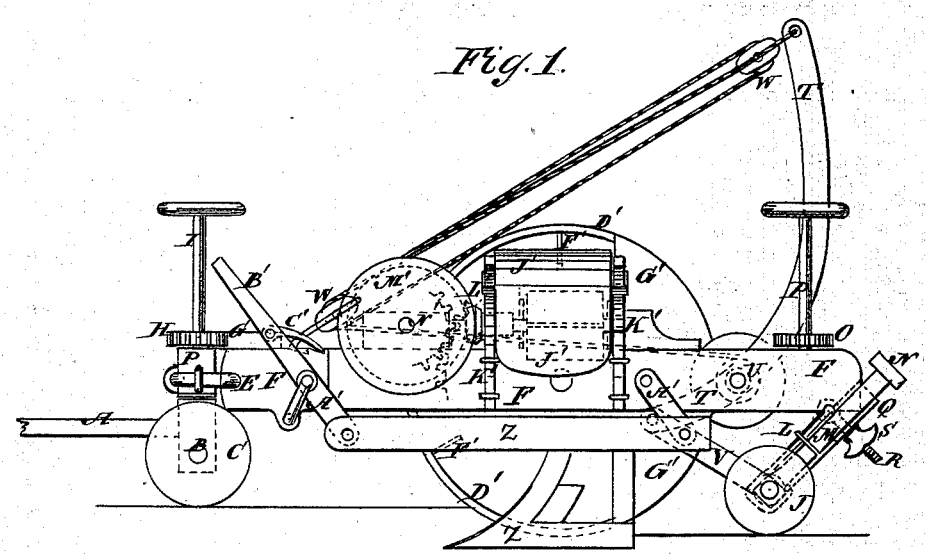
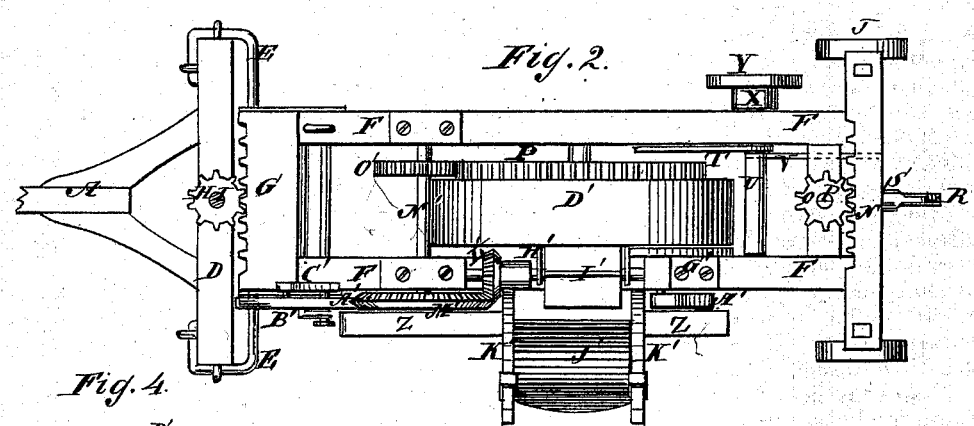
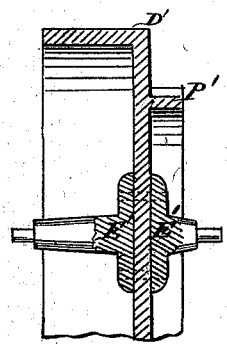
Witnesses:  Inventor:

UNITED STATES PATENT OFFICE.

JOHN M. DUNN AND MURDOCH M. DUNN, OF ERIN, MISSISSIPPI.

IMPROVEMENT IN DITCHING-MACHINES.

Specification forming part of Letters Patent No. 146,810, dated January 27, 1874; application filed July 19, 1873.

*To all whom it may concern:*

Be it known that we, JOHN M. DUNN and MURDOCH M. DUNN, of Erin, in the county of Calhoun and State of Mississippi, have invented a new and useful Improvement in Ditching-Machine, of which the following is a specification:

Figure 1 is a side view of our improved machine. Fig. 2 is a top view of the same. Fig. 3 is a detail view of the rear truck and frame. Fig. 4 is a detail section of the elevating-wheel.

Similar letters of reference indicate corresponding parts.

Our invention has for its object to improve the construction of the machine for which Letters Patent No. 119,334 were granted to JOHN M. DUNN, September 26, 1871, so as to make it more convenient in use and more effective in operation. The invention consists in the combination of the flanged journals with the solid-plank wide-rimmed wheel; in the combination of the wheels, the axle, and the crank-bar with the rear end of the main frame; in the combination of the frame, and its eye-bolt and hand-nut, with the crank-bar, the axle, and the main frame; in the combination of the connecting-bar, the lever, the tackle, the drum, and the crank-wheel, with the axle, the bent bar, the frame, and the main frame; in the combination of the racks and the gear-wheels with the bent bar of the rear wheels, the rod of the forward bolster, and with the main frame; and in the combination of the shield and its arms with the main frame, the winged wheel, and the elevating-wheel, as hereinafter fully described.

A is the tongue, B is the forward axle, C are the forward wheels, and D is the bolster. To the ends of the bolster D are secured the ends of the rod E, which extends along and parallel with the rear side of the bolster D, and passes through the forward end of the frame F, so that the frame F may be slid to adjust the machine laterally to work in any desired part of the excavation. To the forward end of the frame F is attached a rack-bar, G, into the teeth of which mesh the teeth of the small gear-wheel H, attached to a vertical shaft, I, which is pivoted to the bolster D, and may be the upward extension of the king-bolt, and has a hand wheel or crank attached to its upper end for convenience in operating it. J are the rear wheels, which revolve upon the journals of the axle K, to which, near its ends, are attached the ends of the bar L, which is bent twice at right angles, or into crank-form, and the middle or horizontal part of which works in bearings attached to the rear end of the frame F, so that the wheels J and axle K may be swung forward to lower the machine into working position, or swung back to raise the machine for passing from place to place. To the end or vertical parts of the crank-bar L are secured two bars, M, to the upper ends of which is attached a cross-bar, N, upon the forward side of which are formed rack-teeth, which mesh into the teeth of the small gear-wheel O, attached to the vertical shaft P, which is pivoted to the rear end of the frame F, and to its upper end is attached a hand wheel or crank for convenience in operating it to adjust the machine to work in any desired part of the excavation. Q is a frame, the upper end of which is pivoted to the middle or horizontal part of the crank-bar L, so as to slide upon said bar while the machine is being adjusted laterally. The axle K passes through and slides in holes in the lower ends of the frame Q. R is an eye-bolt, through the eye of which the middle part of the crank-bar L passes, and which passes through the upper end of the frame Q, and is provided with a hand-nut, S, so that the machine may be readily secured in place when adjusted. T is a lever, which is pivoted to a shaft, U, attached to the frame F. To the lower end of the lever T is pivoted the upper end of a connecting-bar, V, in the lower end of which is formed a hole, through which passes, and in which slides, the axle K. W is a tackle, one of the blocks of which is attached to the end of the lever T; the other block is attached to the forward part of the frame F, and the end of the rope is attached to a drum, X, attached to the end of the shaft U, and with which is rigidly connected a crank or crank-wheel, Y, so that the wheels J can be conveniently adjusted to raise and lower the machine. Z is the plow, to the forward and rear ends of the beam of which are pivoted the lower ends of the bars A', the upper ends of which are pivoted to the side bar of the frame F. One or both the bars A' may be extended upward to form a lever, B′, for convenience in raising and lowering the plow, and adjusting it to work at any desired depth in the ground. The lever B′ is held in any position into which it may be adjusted by a pawl, C′, pivoted to said lever, and which takes hold of notches or ratchet-teeth formed in or attached to the side bar of the frame F. D′ is a wheel, the body of which is made of plank and solid, and to the opposite sides of its center are attached the flanged inner ends of the journals E′, which work in bearings attached to the frame F. The wheel D′ is made with a wide rim or tread, which projects upon one side of its body, as shown in Fig. 4. In the angle between the body and rim of the wheel D′ is secured small plates F′, arranged radially, and which serve as buckets to carry up the soil thrown into the cavity of the wheel by the plow. G′ is a guard-plate, attached to the frame F in the rear of the axis of the wheel D′, and in such a position as to keep the earth from falling from the ascending buckets F′. As the buckets reach the upper part of the wheel D′, the soil falls from them into the inclined spout H′, attached to the frame F, where it is received upon the wings of the wheel I′, by which it is projected upward and outward to fall upon the ground at the side of the ditch. The earth from the wheel I′ is caused to fall at the desired distance from the wheel D′ by the shield J′, against which it strikes, and which is attached adjustably to the arms K′, which are secured to the frame F. The journals of the winged wheel I′ revolve in bearings attached to the frame F, and to one of its journals is attached a small bevel-gear wheel, L′, the teeth of which mesh into the teeth of the larger bevel-gear wheel M′, attached to the end of the transverse shaft N′, which revolves in bearings attached to the frame F, and to which, at the other side of the wheel D′, is attached a gear-wheel O′, the teeth of which mesh into the teeth of the gear-wheel P′, attached to the side of the wheel D′, so that the winged wheel I′ may be driven by the advance of the machine.

Having thus described our invention, we claim as new and desire to secure by Letters Patent—

1. The combination of the flanged journals E′ with the solid-plank wide-rimmed wheel D′, substantially as herein shown and described.

2. The combination of the wheels J, axle K, and bent or crank bar L, with the rear end of the frame F, substantially as herein shown and described.

3. The combination of the frame Q, eye-bolt R, and hand-nut S, with the crank-bar L, axle K, and frame F, substantially as herein shown and described.

4. The combination of the connecting-bar V, lever T, tackle W, drum X, and crank-wheel Y, with the axle K, bent bar L, frame Q, and frame F, substantially as herein shown and described.

5. The combination of the racks N G and gear-wheels O H with the bent bar L of the rear wheels, the rod E of the forward bolster, and with the frame F, substantially as herein shown and described.

6. The combination of the shield J′ and arms K′ with the frame F, winged wheel I′, and wheel D′ F′, substantially as herein shown and described.

JOHN M. DUNN.
MURDOCH M. DUNN.

Witnesses:
CHESLY D. MALONE,
GEORGE W. HARLEY.